July 22, 1930.  E. C. PETERSON  1,771,310

AUTOMOBILE LOCKING MECHANISM

Filed Aug. 22, 1925   2 Sheets-Sheet 1

INVENTOR.
Elmer C. Peterson
BY
Fay, Oberlin & Fay
ATTORNEYS.

July 22, 1930.  E. C. PETERSON  1,771,310
AUTOMOBILE LOCKING MECHANISM
Filed Aug. 22, 1925    2 Sheets-Sheet 2

INVENTOR.
Elmer C. Peterson
BY
Fay, Oberlin & Fay
ATTORNEYS

Patented July 22, 1930

1,771,310

UNITED STATES PATENT OFFICE

ELMER C. PETERSON, OF CLEVELAND, OHIO, ASSIGNOR TO THE BLOSSOM LOCK COMPANY, OF CLEVELAND, OHIO, A CORPORATION OF OHIO

AUTOMOBILE LOCKING MECHANISM

Application filed August 22, 1925. Serial No. 51,836.

The present improvements relate more particularly to a device for locking the so-called transmission mechanism of an automobile. One principal object is to provide a locking device which may be directly incorporated in the housing of a standard gear shifting mechanism as at present constructed, the locking element being designed to co-operate with certain elements already present in such mechanism. A further object is to provide a lock that may be operated from a point removed any desired distance from the transmission mechanism (as for instance from the dashboard of the automobile), of which such mechanism forms a part, it being understood that the latter is usually located beneath the floor of the vehicle. Still another object is to provide a lock that while easily operated will afford a maximum of security against tampering.

To the accomplishment of the foregoing and related objects, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
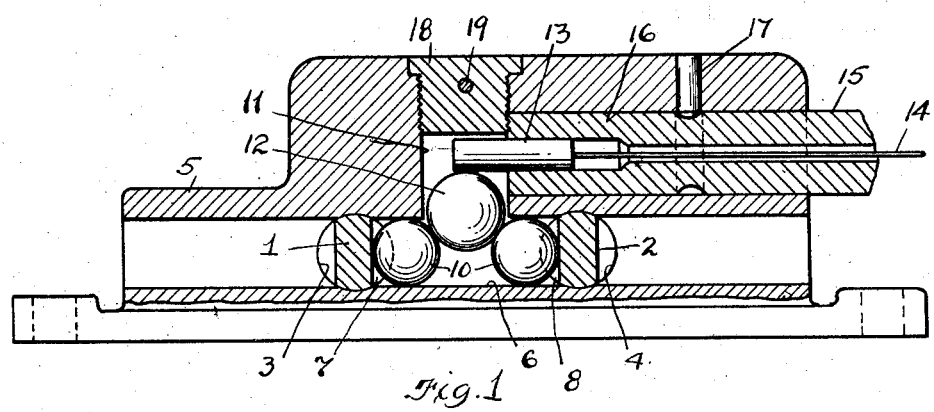
Figure 2:
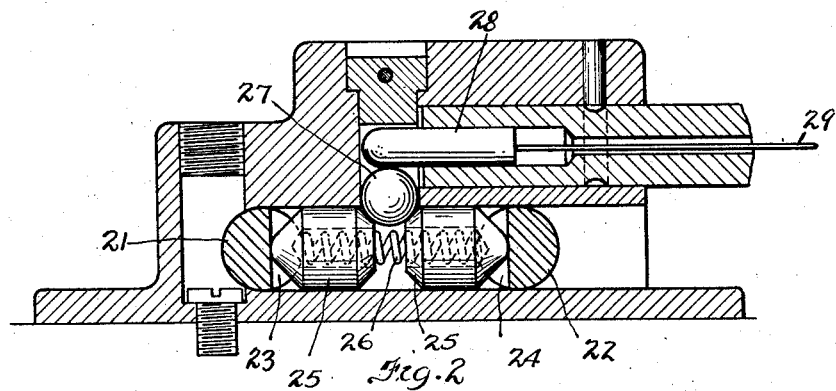
Figure 3:
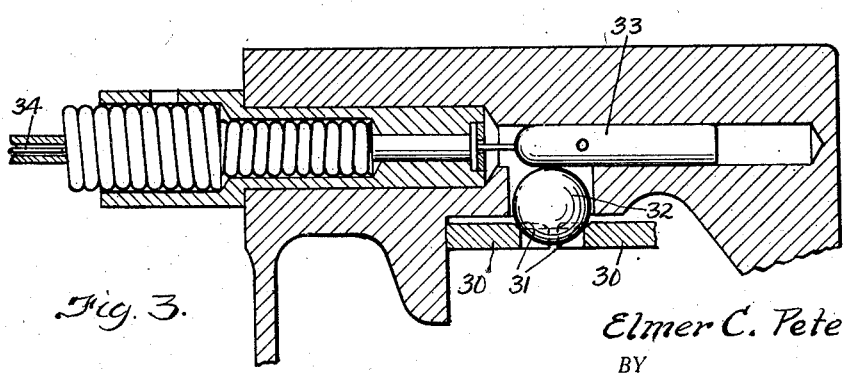
Figure 4:
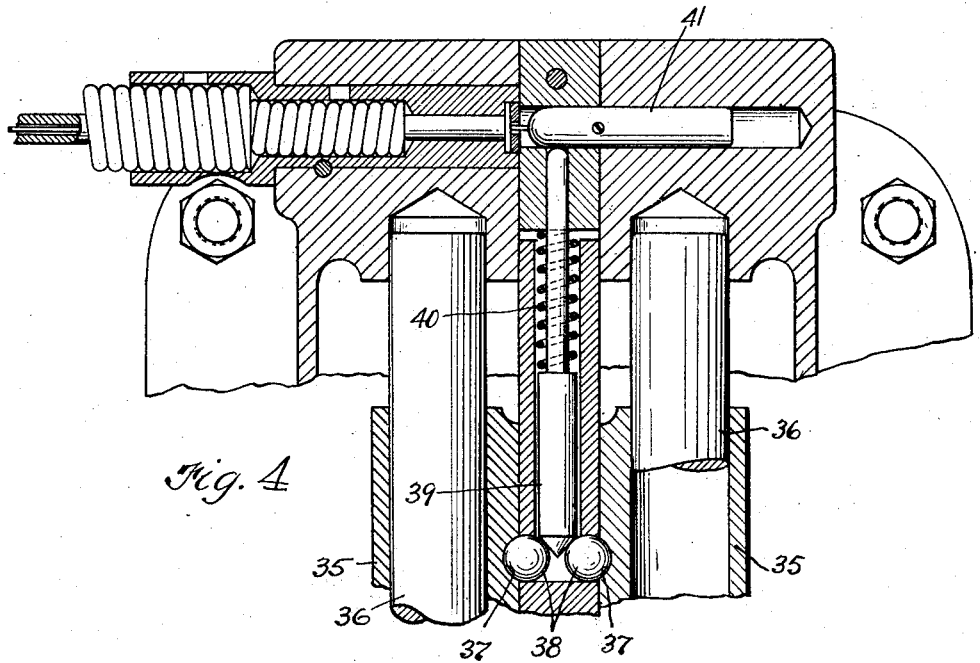
Figure 5:
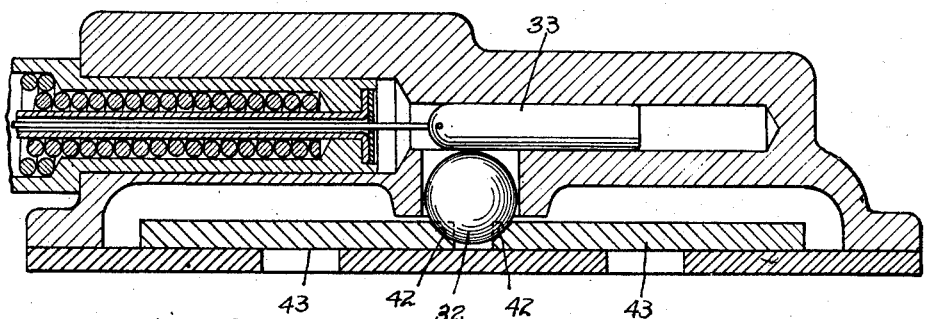

Fig. 1 is a vertical transverse section through a typical transmission mechanism equipped with my improved locking device; Fig. 2 is a similar sectional view of another typical transmission mechanism showing a slightly modified form of the locking device; and Figs. 3, 4 and 5 illustrate the device as applied to still other forms of transmission mechanism.

The transmission mechanism proper has not been illustrated in the foregoing drawing since this will be of standard construction and furthermore forms no part of the present invention. Such standard transmission regularly includes two parallel disposed so-called shifter rods, carrying forks that engage with certain gears of the mechanism so that upon longitudinal movement of said rods, these gears may be variously engaged with other gears to change the speed of the vehicle. The shifting of the rods, as will be readily understood, is accomplished through the medium of the usual gear shift lever, likewise not shown.

In Fig. 1 of the drawing, the shifter rods 1 and 2, which there appear in transverse section, are of the form found in current models of the Dodge automobile, such rods being suitably guided in apertures 3 and 4, respectively, formed in the top cover plate 5 of the transmission mechanism. These apertures are intersected at one point by a transverse opening 6 which, as shown, may extend entirely through the casing member in order to serve another purpose that is of no present interest. On their inwardly directed sides the shifter rods 1 and 2 are formed with similar notches 7 and 8, respectively, that are so located as to be aligned with said opening 6 when the shifter rods are in neutral position, it being in this position that it is desirable to lock said rods in order to prevent operation of the vehicle.

The locking means comprise two hardened steel balls 10 which lie in opening 6 between the shifter bars, such balls being of approximately the same diameter as such opening and being adapted when forced outwardly in opposite directions to engage with the notches 7 and 8 in the respective shifter rods, as shown in full lines in Fig. 1, thereby preventing longitudinal movement of said rods. Leading from opening 6 is a transverse opening or recess 11 in which is held a third hardened steel ball 12, the diameter of which is such as to permit it to drop between the balls 10 far enough to prevent said balls from approaching each other, providing said third ball 12 is held against movement in said recess, but not far enough to prevent the ready displacement of said ball 12, providing it is otherwise free, upon inward movement of either or both of said balls 10. Otherwise stated and as clearly shown in Fig. 1, the center of ball 12 in its locking position lies above a line joining the centers of the balls 10. In order thus to retain ball 12 in its locking position, a suitable keeper is provided, such keeper preferably taking the form of a plunger 13 reciprocably mounted in the casing member so as to be adapted in one position to project in recess 11 and when thus projected to overlie ball 12; while in its retracted position said plunger does not interfere in any way with the free upward movement of the ball in the recess. Said plunger is preferably operated by means of a flexible wire 14 that is capable of exerting a thrust as well as a pull on the plunger, such wire being guided in a tube 15, the end of which is received in an opening 16 in the cover member 5 and there permanently secured by means of a pin 17. For convenience in assembling the parts, the recess 11 preferably extends to the adjacent face of said member 5 and the outer end of the recess is then closed by means of a threaded plug 18, likewise permanently secured in place by means of a pin 19.

From the foregoing description, the operation of the locking device will be readily apparent. In other words, when the keeper or plunger 13 is projected into the recess 11, this being possible only when the shifter rods 1 and 2 are in neutral position, ball 12, which will then naturally assume its locking position between balls 10, is held in such position and movement of the shifter rods thus rendered impossible. However, upon retraction of the plunger by pulling on the wire 14, the ball 12 is free to be displaced into recess 11, or, in other words, either shifter rod in this condition of the parts may be freely moved since the mere weight of the ball 12 is no hindrance to such movement.

The modified construction of locking device illustrated in Fig. 2 differs merely from the one just described in that the transmission mechanism, so far as illustrated, pertains to the current models of the Chevrolet automobile. The shifter rods 21 and 22 have notches 23 and 24 on their inner faces, as before, but instead of balls being provided to engage with said notches when the rods are in neutral position, two cylindrical members 25 are employed, the outer ends of which are suitably beveled, as shown, and a compression spring 26 is interposed between said members in order normally to force them apart.

In adapting this form of transmission mechanism for use with my lock, the inner ends of members 25 are likewise beveled, the degree of such bevel and the space between the members when they occupy their outermost positions being such as to permit a ball 27, that otherwise corresponds with ball 12 of the first described construction, to drop between said members and lock them against movement when said ball is itself prevented from moving upwardly. This is accomplished, as before, by means of a reciprocable keeper or plunger 28 that is arranged to be operated by a wire 29, as need not be further explained.

In certain types of transmission mechanism, for that employed in the Buick automobile, instead of two parallel shifter rods, correspondingly shiftable forks 30 (see Fig. 3) are employed. In adapting my improved lock to this construction, such plates are provided on their inwardly directed edges with corresponding notches 31 that are adapted to be engaged by a ball 32 vertically movable held in an opening in the casing in the same manner as balls 12 and 27 in the previous described constructions. This ball tends normally to assume such engaging position but is readily displaceable therefrom except when the keeper 33 is moved over said ball. For the purpose of positioning the keeper, a flexible wire 34 is employed as before, such wire, however, being connected with the keeper to pull it into its locking position and to push it out of such position.

In the form of transmission mechanism illustrated in Fig. 4, the shifter elements 35 are carried by fixed parallel rods 36 and have notches 37 adapted to be respectively engaged by two balls 38 corresponding with the balls 10 of Fig. 1. In place, however, of a third ball co-operating with said balls 38, a plunger 39 is displaceably mounted adjacent the opening in which said balls are confined, said plunger having a beveled end that is adapted to enter between the balls. In this construction, the locking device lies at one end of the shifting mechanism, instead of above the same, and a light tension spring 40 is accordingly utilized to normally urge the plunger into its engaging position and yet leave it free to be readily displaced therefrom except when keeper 41 is moved across the outer end of said plunger whereupon the latter will effectually lock the balls 38 in engagement with the notches in the shifter elements. The foregoing transmission mechanism, it may be stated, is that currently in use on the Jewett automobile.

The construction illustrated in Fig. 5 is substantially identical with that employed in one of the current Peerless models and does not differ materially from the construction illustrated in Fig. 3 except that the ball 32 here engages with notches 42 in the shifter mesh lock plates 43 instead of in the shifter forks found in the Buick transmission. The same arrangement of keeper 33 is employed here as in Fig. 3 and the operation of the lock does not require further description.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In automobile locking mechanism the combination with the transmission including a shifter element; of a member movably held adjacent said element and adapted in one position to engage therewith to prevent shifting thereof, said member tending normally to assume such engaging position but being readily displaceable therefrom; and means including a movable keeper adapted to prevent such displacement of said member, said keeper being arranged and constructed to be operated from a point removed from said transmission; and a flexible member extending from without the transmission case for actuating said keeper.

2. In automobile locking mechanism the combination with the transmission including a shifter element; of a ball movably held adjacent said element and adapted in one position to engage therewith to prevent shifting movement thereof, said ball tending normally to assume such engaging position but being readily displaceable therefrom; means including a transversely movable keeper adapted to prevent such displacement of said ball; and a flexible wire connected with said keeper adapted positively to actuate the same in both directions.

3. In automobile locking mechanism the combination with the transmission including two parallel shifter rods each formed with a notch on its inwardly directed face; of two members transversely movably held between said rods and adapted in one position to engage with the notches in said rods, respectively, to prevent shifting of the latter, said members being normally individually displaceable from such position; a ball movable at approximately right angles to the path of movement of such members, said ball being adapted to enter between the latter when they engage with said rods but being normally displaceable from such position; a keeper for said ball movable transversely of the path of the latter; and a flexible wire connected with said keeper adapted positively to actuate the same in both directions.

4. In automobile locking mechanism the combination with the transmission including two parallel shifter rods each formed with a notch on its inwardly directed face; of two balls movably held between said rods and adapted in one position to engage with the notches in said rods, respectively, to prevent shifting of the latter, said balls being normally individually displaceable from such position; a third ball movable at approximately right angles to the path of movement of said first two balls, said third ball being adapted to enter between said other ball, but being normally displaceable from such position by inward movement of said other balls; a keeper for said third ball movable transversely of the path of the latter; and a flexible wire connected with said keeper adapted positively to actuate the same in both directions.

Signed by me this 21st day of August, 1925.
ELMER C. PETERSON.